(No Model.)　　　　　H. W. CLAPP.　　　5 Sheets—Sheet 1.
ROAD VEHICLE.
No. 577,185.　　　　　Patented Feb. 16, 1897.
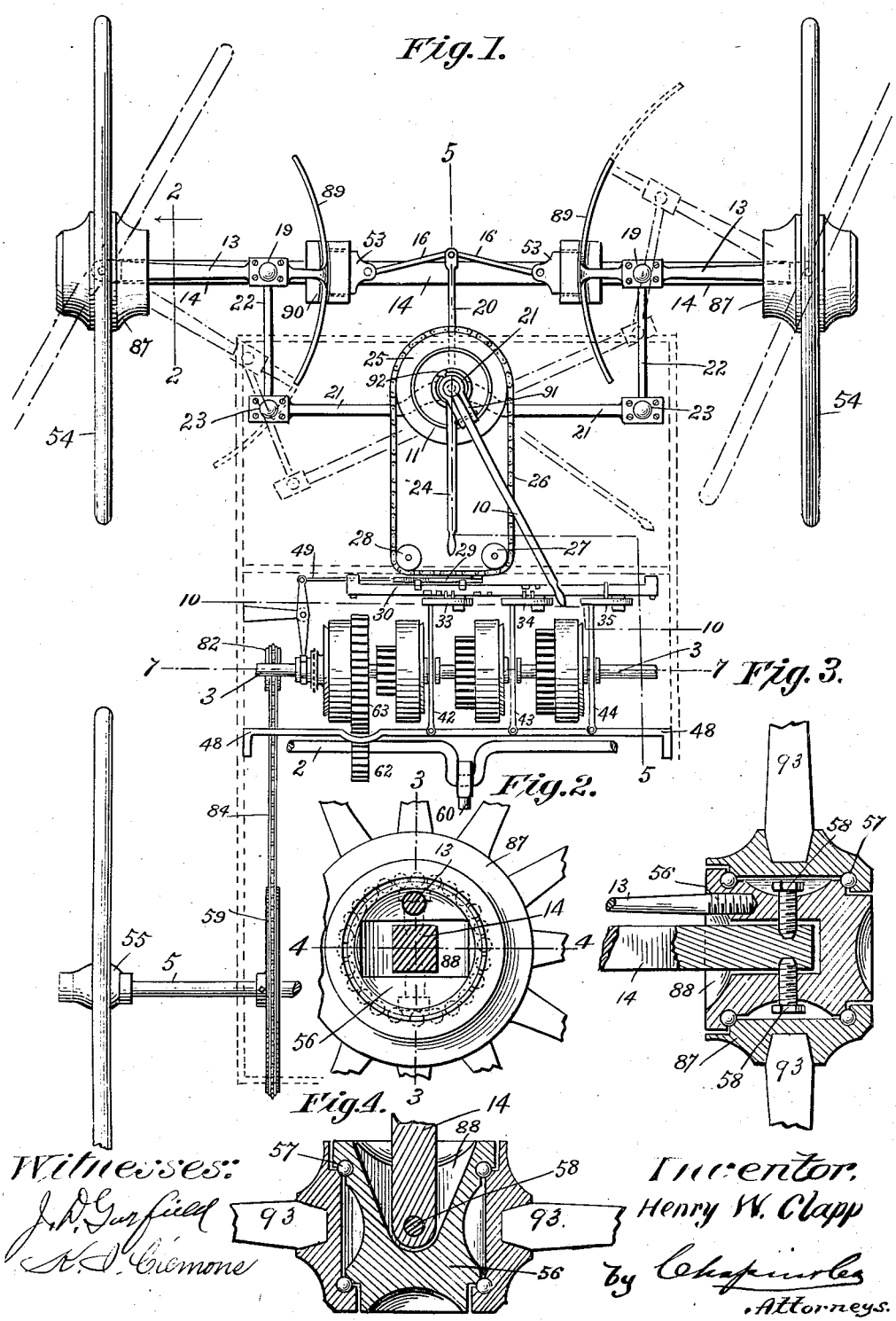
Witnesses:　　　　　　Inventor,
　　　　　　　　　　　Henry W. Clapp
　　　　　　　　　by
　　　　　　　　　　　　Attorneys.

(No Model.)  5 Sheets—Sheet 2.

H. W. CLAPP.
ROAD VEHICLE.

No. 577,185. Patented Feb. 16, 1897.

Witnesses:
J. D. Garfield
K. S. Clemons

Inventor:
Henry W. Clapp.
by Chipmire Co
Attorneys.

(No Model.) 5 Sheets—Sheet 3.

H. W. CLAPP.
ROAD VEHICLE.

No. 577,185. Patented Feb. 16, 1897.

Witnesses:
J. W. Garfield
K. I. Clemons

Inventor:
Henry W. Clapp,
by Chapin & Co.
Attorneys (No Model.) 5 Sheets—Sheet 4.

H. W. CLAPP.
ROAD VEHICLE.

No. 577,185. Patented Feb. 16, 1897.

Witnesses:
J. D. Garfield
K. S. Clemons

Inventor
Henry W. Clapp.
by Chapin & Co.
Attorneys (No Model.)

H. W. CLAPP.
ROAD VEHICLE.

No. 577,185.

5 Sheets—Sheet 5.

Patented Feb. 16, 1897.

Witnesses
J. D. Garfield
H. S. Clemons

Inventor,
Henry W. Clapp.
by Chapin & Lee
Attorneys.

UNITED STATES PATENT OFFICE.

HENRY W. CLAPP, OF SPRINGFIELD, MASSACHUSETTS.

ROAD-VEHICLE.

SPECIFICATION forming part of Letters Patent No. 577,185, dated February 16, 1897.

Application filed November 9, 1895. Serial No. 568,396. (No model.)

*To all whom it may concern:*

Be it known that I, HENRY W. CLAPP, a citizen of the United States of America, residing at Springfield, in the county of Hampden and State of Massachusetts, have invented new and useful Improvements in Road-Vehicles, of which the following is a specification.

This invention relates to motor-propelled vehicles, the object being to provide improved mechanism intermediate of the wheels thereof and the motor for transmitting motion from the latter to the driving-wheels and for starting, stopping, and otherwise governing the movements of the vehicle on a road; and the invention consists in the peculiar construction and arrangement of said mechanism, all as hereinafter fully described, and more particularly pointed out in the claims.

Figure 5:
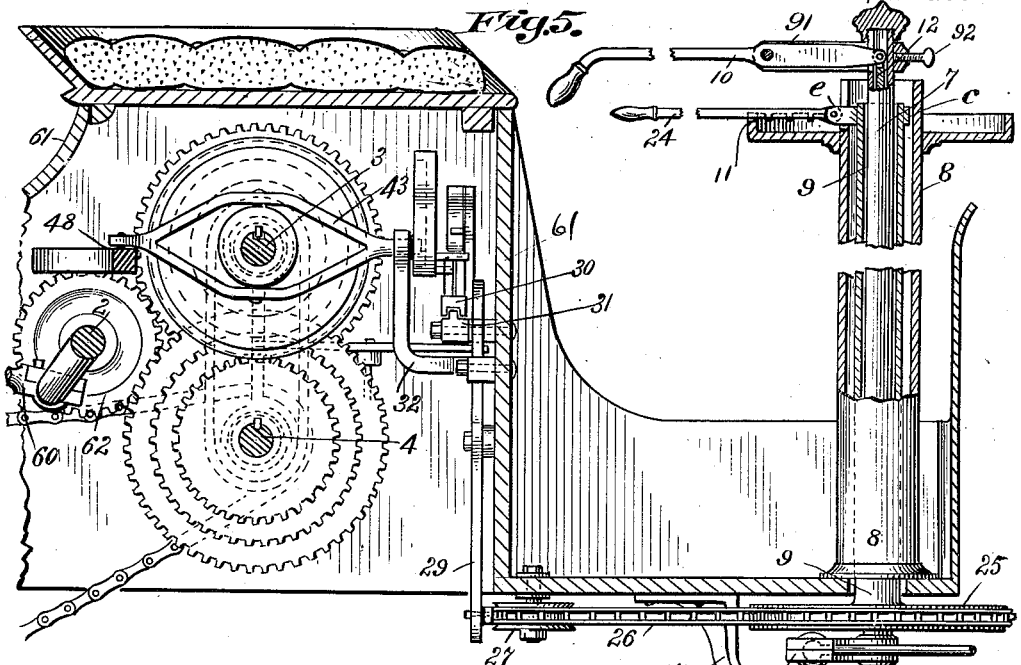
Figure 6:
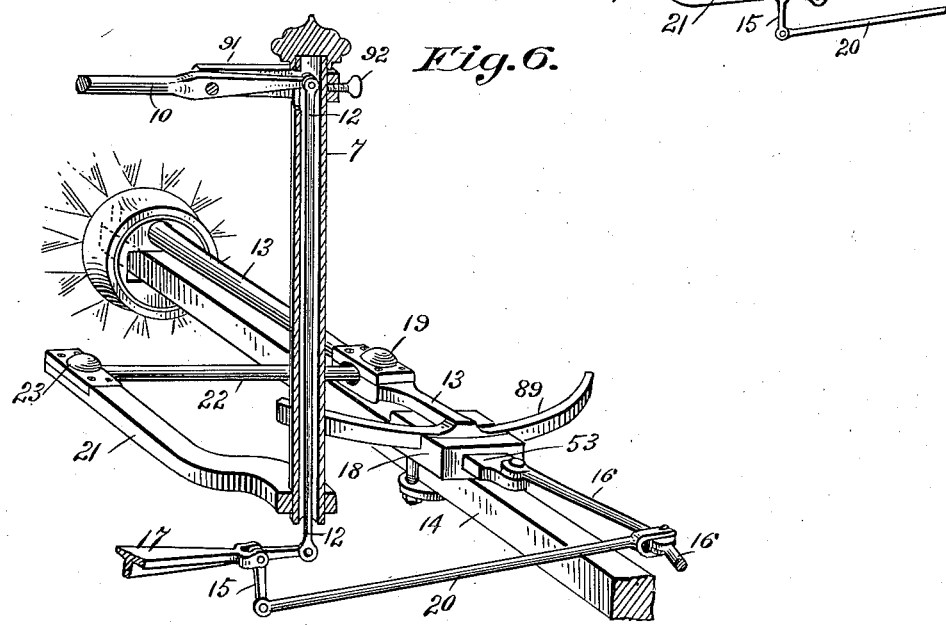
Figure 7:
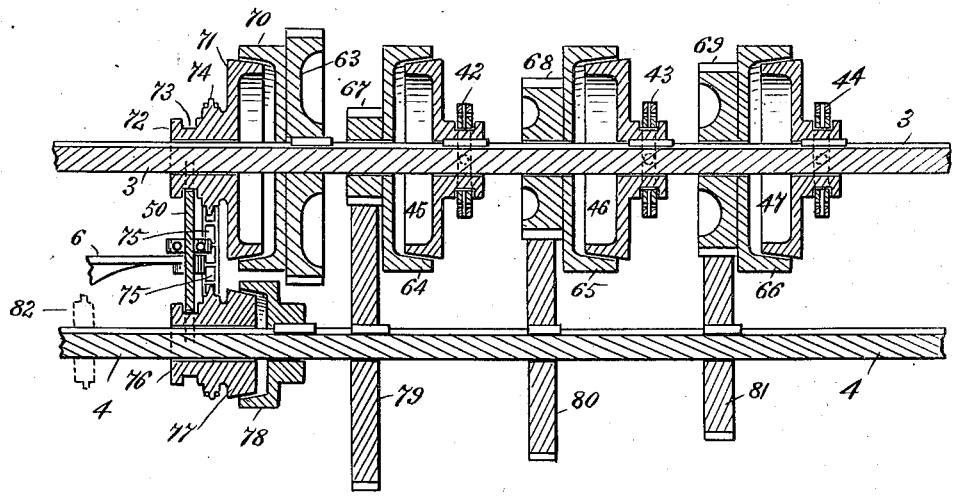
Figure 8:
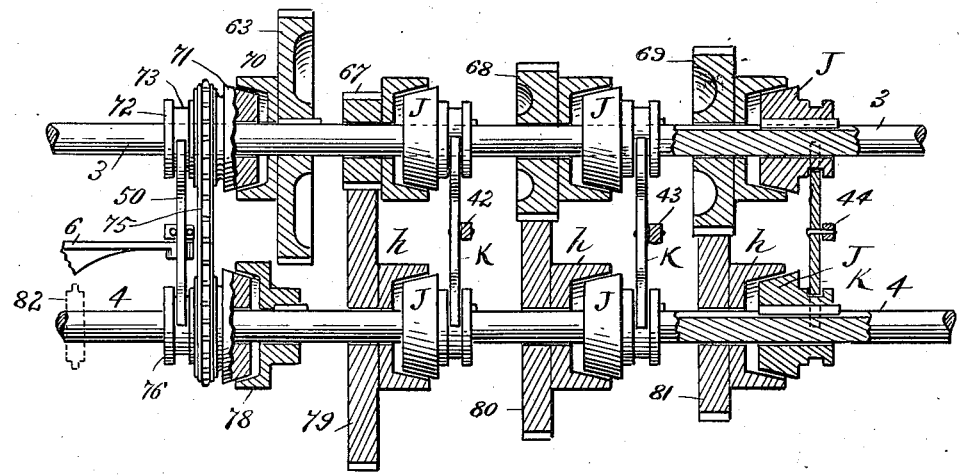
Figure 9:
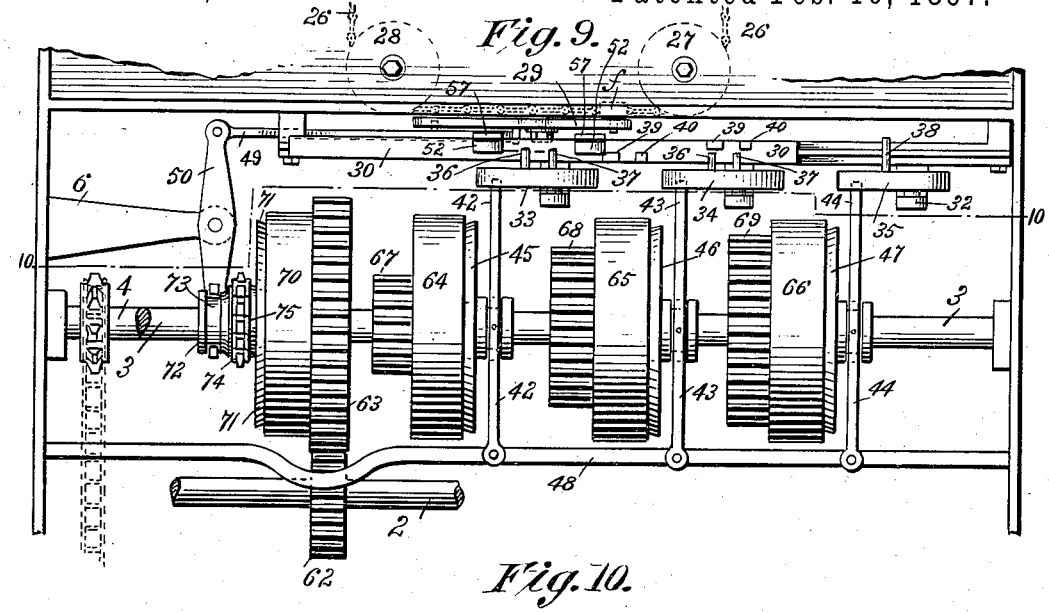
Figure 10:
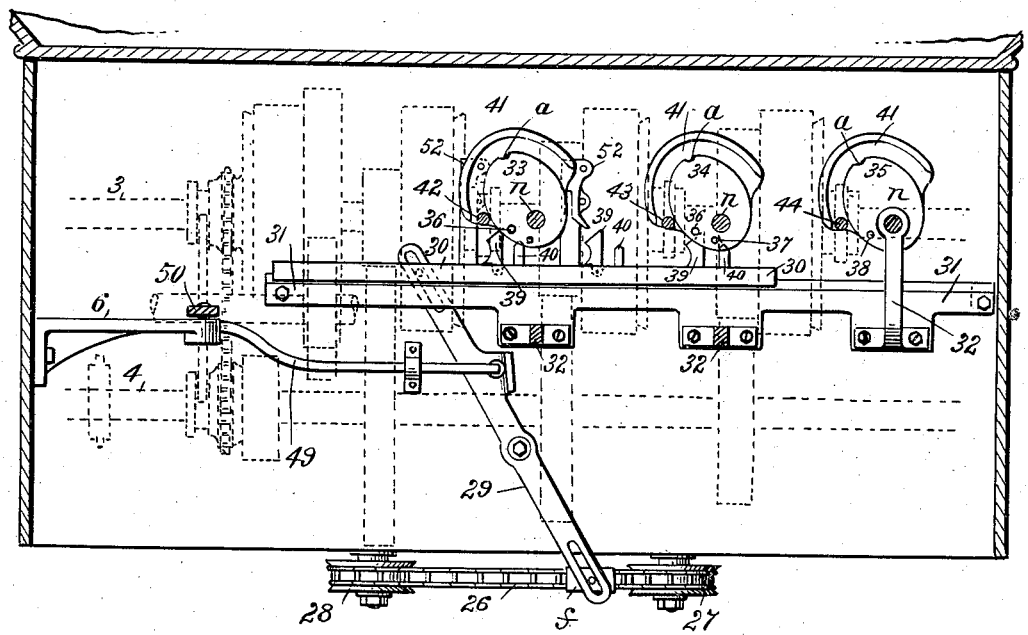
Figure 11:
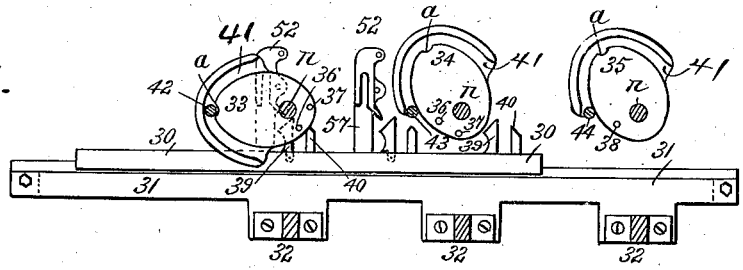
Figure 12:
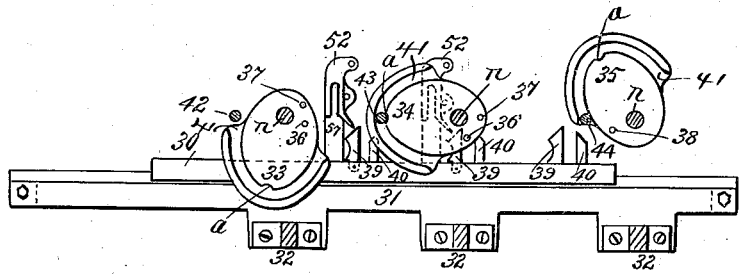

In the drawings forming part of this specification, Figure 1 is a plan view of parts of a motor-vehicle and mechanism for operating the same embodying my improvements, and are hereinafter fully described, parts of the vehicle being shown in dotted lines. Fig. 2 is a plan view of the inner end of the hub of one of the forward wheels, showing parts of the spokes thereof and parts in section, as below described. Fig. 3 is a sectional view on line 3 3, Fig. 2. Fig. 4 is a sectional view of said hub on line 4 4, Fig. 3. Fig. 5 is a sectional view on line 5 5, Fig. 1. Fig. 6 is a perspective view of a part of the front axle and one wheel-hub and of steering devices hereinafter described. Fig. 7 is a sectional view on line 7 7, Fig. 1. Fig. 8 illustrates a modification of the construction shown in Fig. 7, hereinafter described. Fig. 9 is a plan view of certain of the mechanism illustrated in Fig. 1, but on an enlarged scale for the purpose of clearness. Fig. 10 is a sectional view on line 10 10, Fig. 9. Figs. 11 to 15, inclusive, represent parts of the above-referred-to mechanisms in different operative positions, as below described.

The crank or driving shaft 2 is connected with any suitable motor, the latter not being shown in the drawings. Fig. 1 shows the central portion of said shaft between its extremities, in which the crank is located, and a portion 60 of a motor piston-rod connected with said crank. Said shaft 2 is in practice supported in suitable bearings under the seat 61 of the vehicle, in the position shown in Fig. 5. Said crank-shaft has a gear 62 rigidly secured thereon, which constitutes the preferable means for communicating the rotary motion of said crank-shaft to the controller-shaft 3, the latter being the one through which certain below-mentioned mechanisms are operated. Said gear 62 engages a gear 63, fixed on said shaft 3. On said shaft 3 are fixed the cup parts 64, 65, and 66 of friction-clutches, in which the disk parts 45, 46, and 47 respectively engage in the usual manner of such clutches. Each of said cup parts has a gear fixed on its closed side, as shown, which gears are of varying diameters for the purpose of imparting varying speeds to the vehicle through shaft 4 and gears thereon, as hereinafter described. Said shaft 3 has also a friction clutch-cup 70 fixed to one face of said gear 63 thereon, in which the clutch-disk 71 operates. Said disk 71 has a hub 72, having an annular groove 73 around it, in which a shipping-lever 50 engages to move said last-named disk and a sprocket-wheel 74 thereon. Fig. 7 illustrates said shaft 3 and the said clutch and gear parts thereon in section. A chain 75, running on said sprocket-wheel 74, connects said hub 72 with a similar sprocket-bearing hub 76 on a shaft 4, the latter-named shaft occupying a position normally thereunder. (See Fig. 7.) Said clutch 71 and the clutch 77 provide means for stopping the vehicle while shaft 3 continues to rotate. Said shaft 4 is adapted to be driven by shaft 3 at different speeds, as determined by the engagement of either one of the above-mentioned clutch-disks 45, 46, or 47 with its respective cup, by means of the said chain 75, which runs on the said sprocket-wheels which are provided, respectively, on hubs 72 and 76. Said shaft 4 has fixed thereon a gear 79, which engages with gear 67 on clutch-cup 64 on shaft 3, and a gear 80, which engages with gear 68 on clutch-cup 65 on shaft 3, and a third gear 81, which engages with gear 69 on clutch-cup 66 on shaft 3.

It will be observed that the before-mentioned three gears 79, 80, and 81 are arranged in reverse order on shaft 4, as to the diameters thereof, relative to the said clutch-cup gears 67, 68, and 69, with which they engage.

The vehicle is driven by a sprocket-andchain connection between the rear axle 5 of the vehicle and said shaft 4, as indicated in Fig. 1, wherein 82 is a sprocket-wheel on said shaft 4, and 83 indicates a sprocket-wheel on said rear axle, and 84 is a chain connecting said two last-named sprocket-wheels. The said clutches 71 and 77 are adapted to move by lever 50 simultaneously to and from their respective cups 70 and 78 to start and stop shaft 4. Said clutches 71 and 77 are in engagement with their respective cups 70 and 78 to turn shaft 4, for backing the vehicle, only when the three clutches on shaft 3 which engage gears 67, 68, and 69 are disengaged. Then clutches 71 and 77 being free to cause the vehicle to move forward, at first slowly, clutch 45 on shaft 3 is first engaged, and subsequently, one after the other, clutches 46 and 47 are engaged, the first-engaged two clutches being then disengaged to cause the gear 69 to act on the smaller gear 81 on shaft 4 and drive it at the highest speed.

The mechanism for stopping and starting the vehicle and for controlling the speed thereof is all operated by a person on the seat 61, and said mechanism, assuming that a motor is running the said shafts 3 and 4, as described, is constructed and operated as follows: A suitable tubular post 8 is secured to the floor of the vehicle in a vertical position, as shown in Fig. 1, having a disk 11 fixed in a horizontal plane thereon near its upper end, on which is an upturned border having a series of notches in its edge, as shown. Within said post 8 is a tubular shaft 9, supported in a suitable bearing at the base of said post 8, having an operating-handle 24 secured thereon and extending toward the seat of the vehicle within convenient reach of a person on said seat, whereby shaft 9 may be turned, as below described. Said handle is secured to said shaft by means of a yoke $c$, clamped thereon, the ends of which are brought around the shaft and terminate in two ears $e$, between which one end of said handle 24 is pivotally attached, whereby its free end may be moved up and down, so that the handle when desired may be engaged in one of said notches in the border of the said disk 11 to retain said handle and post 8 temporarily in certain positions for a purpose below described. On the lower end of said shaft 9 a sprocket-wheel 25 is secured, on which is a drive-chain 26, which, as shown in Figs. 1 and 5, runs around two guide-wheels 27 and 28, which are supported on a suitable fixed part of the vehicle near to said shaft 3. The degree of movement of said chain 26 is about the distance between the opposite faces of said wheels 28, as shown in Fig. 10, this latter figure showing a plate $f$ connected to said chain 26, having a pin thereon engaging in a slot in the shipper-operating lever 29, said lever being pivoted to a fixed part of the vehicle. The movement of chain 26 by reciprocally rotating said shaft 9 by the use of said lever 24 causes a movement of said plate $f$ back and forth between said guide-wheels and the consequent vibratory movement of said lever 29.

A shipper-bar 30 is fitted to slide on a track-plate or guideway 31, which is supported on the inner side of the front panel of the seat 61. Said bar has a pin thereon entering a slot near one end of said lever 29, whereby said lever and bar have a suitable operative connection through which said vibratory movements of the bar cause said bar to slide back and forth on its said track 31 in consonance with the movements of said hand-lever 24. A connecting-rod 49, Figs. 1, 9, and 10, engages said lever 29 by one end and by its opposite end the said clutch-shipping lever 50. Said shipper-bar 30 has fixed on its edge the posts 39 and 40 for engagement with the cams 33, 34, and 35, Figs. 10 to 14, inclusive, as below described, when said bar is given said sliding movement, for the purpose of operating devices below described to engage and disengage said clutch-disks 45, 46, and 47 with and from their respective clutch-cups on said shaft 3. Said cams 33 to 35, inclusive, are supported to rotate on bolts $n\ n\ n$, which are maintained in positions by engagement at one end with said panel and by their outer ends with brackets 32, secured, as shown, to said track 31. Said cams 33 and 34 have each the pins 36 and 37 projecting from their rear faces, and cam 35 has the single pin 38 in like position thereon, and all three of said cams are provided each with a cam-slot 41, extending around a portion of the periphery thereof, as shown, and each with an indentation $a$ in the border thereof.

A bar 48, Figs. 1 and 9, extending in a line with said shaft 3, is fixed to the vehicle, and to said bar three shipping-levers 42, 43, and 44 are pivoted by one end. A side elevation of one of said shipping-levers (43) is shown in Fig. 5. Said last-named shipping-levers engage by one end with the said slots 41 of each of said cams 33, 34, and 35 and intermediately with the grooved hubs of said friction clutch-disks 45, 46, and 47 on shaft 3. A rotary motion of said cams induces a swinging movement in said shipping-levers, whereby the said clutch-disks act separately to cause said shaft to be rotated or to cease turning, and at different speeds of rotation, as above set forth. Figs. 7, 8, 9, and 10 of the drawings illustrate the above-referred-to devices for stopping, starting, and controlling the speed of the vehicle while in a state of rest, or, in other words, the positions which they relatively occupy when the vehicle is not in use.

The operation of the last-named devices is as follows: The movement of said lever 24, communicated to said shipper-bar 30 by means of the described intermediate devices, whereby the vehicle is moved, first carries a post 39 on bar 30 (see Fig. 10) against the pin 36 on cam 33, thereby turning said cam from the position shown in Fig. 10 to that shown in Fig. 11, whereby the end of the shipping-lever 42 engaging with said cam is swung in such direction as to cause clutch-disk 45, connected to said lever, to be engaged with its cup 64, (assuming that shaft 4 and gear 79 are rotating,) thereby causing shaft 3 to rotate at a speed relative to shaft 4 determined by the difference of the diameters of gears 79 and 67. With said cam 33 in the position shown in Fig. 11 the end of the shipping-lever 42 engaged therewith is more or less retained in the position shown in the slot 41 by engagement with the depression *a* in the cam, and the same is the result with the cams 34 and 35 when the latter and their respective shipping-levers occupy similar positions. The shipper-bar 30 in practice is moved as aforesaid only far enough to operate one of said cams against its proper shipping-lever at a time. When it becomes desirable to change the speed of the vehicle, the bar 30 is moved from the position shown in Fig. 11 to that shown in Fig. 12, thereby, by the further action of said post 39 on said pin 36 on cam 33, turning said last-named cam to the position shown in Fig. 12, whereby rod 42 is swung so as to draw said clutch-disk 45 away from its cup 64 or disengage the clutch comprising those parts. Said last-named movement of shipping-bar 30 serves to engage a second one of said posts 39 with the cam 34 and swing the latter from the position shown in Fig. 11 to that shown in Fig. 12, which latter position, through the action of like devices to those described in connection with said cam 33, causes the engagement of the clutch parts 65 and 46 on shaft 3, Fig. 9, and the engagement of gear 80 on shaft 4 with gear 68 on shaft 3, and a corresponding change of speed of the vehicle, as aforesaid, and the same action is the result when cam 34 is turned to the position shown in Fig. 13 and the next cam 35 is brought to the position there shown for clutching the parts 66 and 47 on shaft 3. Thus the above-mentioned different speeds of the vehicle are produced.

To decrease the speed of the vehicle or to stop it, the bar 30 is moved to the left.

Figure 13:
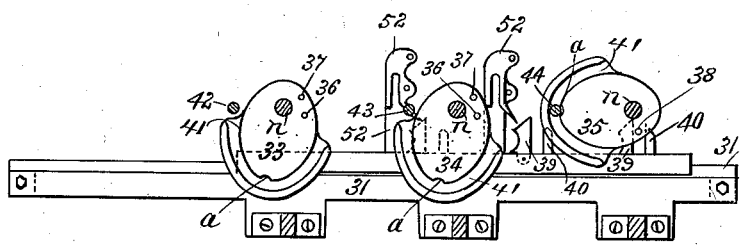
Figure 14:
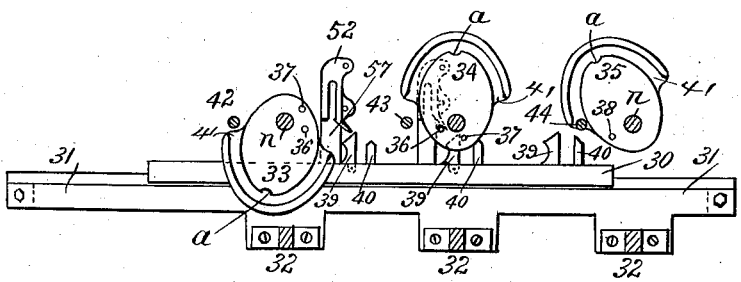
Figure 15:
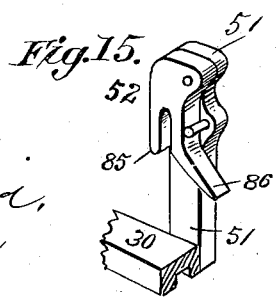

Referring to Fig. 13 and positions of cams and bar 30 there shown, upon moving said bar to the left post 40 at the extreme right engages pin 38 on cam 35 and turns it to normal position, as in Fig. 14. Fig. 15 illustrates a post 51 and a latch 52 thereon on a larger scale than said parts are shown in Figs. 11 to 14, inclusive. Said posts are secured on the rear side of said shipping-bar 30, and the purpose and action of said latch are below described. Simultaneously with said bar movement the point 85 of latch 52 engages pin 37 of cam 34 and swings nearly a half-turn, at which point said latch and pin are disengaged, and the cam-shaped point 86 of said latch 52, by engagement with pin 36 on cam 34, completes the movement necessary to leave said cam 34 in its normal position, or that shown in Fig. 11. The dotted position of the latch 52 in Fig. 14 is that which it occupies just before the completion of the movement of said cam above described. After having, by position of cam 33, as in Fig. 11, started the vehicle at first speed, if desired to then again stop the vehicle, a movement to the left of bar 30 will, by engagement of post 40 with pins 36, turn cam 33 to the position of rest shown in Fig. 10. The replacement of cam in position is in like manner operated in respect to cams 34 and 35.

Referring to the modified construction of the interconnecting devices shown in Fig. 8, shaft 4 is there shown to have the gears 79, 80, and 81 hung loosely thereon instead of being keyed thereto, as shown in Fig. 7, and each of said gears has a friction clutch-cup *h* thereon. The gears 67, 68, and 69 on shaft 3 of said modification are substantially the same as in Fig. 7. Clutch-disks J are splined on shafts 3 and 4, so that they shall rotate with the latter and may slide thereon. Said disks J are connected in pairs by a clutch-bar K, whereby each pair is moved independently into and out of engagement with an oppositely-arranged pair of gears on said two shafts, as, for instance, the pairs of gears 67 and 79, 68 and 80, and 69 and 81. Said clutch-bars K are adapted to be actuated by the aforesaid shipping-levers 42, 43, and 44, which in this instance are secured to said bars K instead of engaging directly with the hubs of the clutch-disks, as shown in Fig. 7.

The forward axle 14 of the vehicle is illustrated in Fig. 1 in connection with the two forward wheels 54. The said forward wheels consist of the usual wheel construction, excepting that the hubs 87 thereof, as shown in Figs. 3 and 4, have a chamber therethrough from end to end, and around the inner wall of said chamber are annular grooves to receive a series of bearing-balls 57. The said hubs 87 have each of them a cylindrical non-rotatable axle-bearing 56 in said chamber, and grooves in the latter located opposite those of said wheel-hub, as shown. Said grooves in said hub and bearing form channels for the said two series of balls 57, whereby ball-bearings for each forward wheel are provided on said axle-bearing. The spokes of said wheel are indicated by 93. An axle-bearing of the foregoing description (see Figs. 3 and 4) is pivotally connected to each end of said forward axle in such relation to the latter that it may have a swinging movement thereon in a horizontal plane, whereby the said forward wheels 54 may be turned to different positions, as indicated by dotted lines in Fig. 1, for running the vehicle in directions as usual. The said pivotal connections between said bearings 56 and the end of the axle consist of the screws 58, which are set in the axial line of the spokes of the wheel, whereby the thrust against the extremities of the spokes is in direct line of said pivot connections, thereby providing the greatest strength of resistance. The said forward axle 14 is secured to the vehicle in a fixed position, and said bearings 56 are pivoted on the ends thereof by means of the two screws 58, and to permit the said bearings 56 to swing on the axle with said wheels a tapered recess 88 is made in the inner end of each of said bearings. Thus each forward wheel rotates independently on its bearing 56, and they are swung to the required steering positions, and may be temporarily secured therein, by the below-described steering mechanism, which is adapted to be operated by a person on the seat of the vehicle. To each of said bearings 56 is rigidly fixed a lever 13, Figs. 1 and 3, by screwing one end into said bearing, or in any other suitable manner. Said levers 13 extend from said bearings over said axle toward the center thereof, and on the inner end of each, over said axle, is rigidly fixed a segment 89. A block 18 is fixed on the top of said axle under each of said segments, which blocks each have a groove therein to receive the lower edge of one of said segments, and in which the latter may move freely, except when restrained, as below described, so that they are held in different positions, as indicated by dotted lines in Fig. 1. Swinging movements above said axle 14 are imparted to said segments, levers 13, and by the latter to the forward wheels 54, by means of a vibratory yoke-bar 21, which is attached to said lever 13 by the connecting-rods 22 22. Ball-bearings of ordinary construction, 19 and 23, are provided on the ends of said bar 21 and on said levers to provide frictionless connections between said parts. The said yoke-bar 21 is fixed on the lower end of a steering-post 7, Figs. 1, 5, and 6, which post extends vertically within said outer tubular shaft 9 in front of the vehicle-seat 61. On said post 7, near its upper end, Figs. 1 and 5, is provided a lever-holder 91, one end of which surrounds said last-named post and has a thumb-screw 92 therethrough, whereby said holder and the lever 10 thereto connected, as below set forth, may be swung to various positions relative to the said seat. Said lever-holder extends horizontally from said post 7 rearwardly in two separated arms, (see Fig. 1,) between which arms is pivoted a steering-lever 10, one end of which extends through the side of said post 7. This last-named lever serves, by swinging it horizontally, for turning post 7, and consequently giving a vibratory movement to said yoke 21, and by swinging it vertically for actuating the presser-bars 53, which pass through openings in the ends of said blocks 18 on the forward axle 14, said presser-bars being operated to press against the sides of said segments and clamp them in said groove in which they move in said block 18. Said presser-bars 53 are operated as aforesaid by two toggle-levers 16, Figs. 1 and 6, pivoted to said bars and centrally to each other, a connecting-rod 20 connecting said levers 16 to an elbow-lever 15, hung on the bracket 17. Said elbow-lever has one arm connected to a vertical rod 12, whose upper end is pivotally connected to the extremity of said lever 10 within said post 7. Hence by lifting the free end of said handle 10 said toggle-levers are so drawn upon as to cause the said presser-bars 53 to be pressed against the segments 89, thereby holding the said forward wheels in any desired position. When said segments are free to be moved by the action of yoke-bar 21, the vehicle may be steered in any forwardly-moving direction by swinging said lever 10 horizontally and operating said yoke-bar, as described.

Having thus described my invention, what I claim, and desire to secure by Letters Patent, is—

1. In a road-vehicle, a non-rotatable forward axle, cylindrical axle-bearings pivoted on said axle, combined with wheels rotating on said bearings, a lever fixed to the inner end of each of said bearings extending therefrom toward a central point between said wheels, a segment fixed on the free end of each of said levers, grooved blocks fixed on said axle under said segments, and receiving in the grooves thereof the edges of said segments, presser-bars moving in said blocks against and from said segments, and means for moving said presser-bars and for imparting a swinging movement to said levers, substantially as set forth.

2. In a road-vehicle, a non-rotatable forward axle, cylindrical axle-bearings pivoted on said axle, combined with wheels rotating on said bearings, a lever fixed to the inner end of each of said bearings extending therefrom toward each other, the segments, grooved blocks fixed on said axle under said segments and receiving in the grooves thereof the edges of said segments, presser-bars in said blocks for action against said segments, toggle-levers between the outer ends of said blocks, the hand-lever 10, and connections between said hand-lever and toggle-levers for actuating the same, whereby said presser-blocks are moved, substantially as set forth.

3. In a road-vehicle the combination of the hand-lever 10, an elbow-lever 15, toggle-levers 16, a connecting-rod uniting said elbow-lever and toggle-levers, the presser-bars 53, blocks 18, and the segments 89, substantially as set forth.

4. In a road-vehicle the shafts 3 and 4, combined with a driving-gear 63, having a clutch-cup on one face fixed on shaft 3, by which gear the last-named shaft is driven, a clutch-cup 78, fixed on shaft 4, sprocket-bearing clutch-disks for said cups, a drive-chain engaging said sprockets, a clutch-bar engaging said clutch-disks, and means for moving said bar and disks simultaneously to, and away from said clutch-cups, substantially as set forth.

5. In a road-vehicle the shafts 3 and 4, combined with a driving-gear 63, having a clutch-cup on one face fixed on shaft 3, by which gear the last-named shaft is driven, a clutch-cup 78, fixed on shaft 4, sprocket-bearing clutch-disks for said cups, a drive-chain engaging said sprockets, a clutch-bar engaging said clutch-disks, the shipper-lever 29, connected to said clutch-bar, the vertical post 9, the hand-lever 24, thereon, extending toward the seat of the vehicle, a sprocket-wheel on said post, guide-wheels 27 and 28, and a drive-chain carried by said sprocket and guide wheels, engaging with said shipper-lever, substantially as set forth.

6. In a road-vehicle the shaft 3, geared to the crank-shaft, shaft 4, having several gears of differing diameters fixed thereon, combined with clutch devices freely hung on said shaft 3, engaging said several gears, pivoted shipping-levers engaging said several clutch devices, a reciprocally-rotating cam engaging one end of each of said shipping-levers, and means for turning said cams successively, whereby said gears of differing diameters are brought alternately into action, substantially as described.

7. In a road-vehicle the shaft 3, geared to the crank-shaft, shaft 4, having several gears of differing diameters fixed thereon, combined with clutch devices freely hung on said shaft 3, engaging said several gears, pivoted shipping-levers engaging said several clutch devices, a cam engaging one end of each of said shipping-levers, a shipper-bar 30, having posts thereon engaging said cams, whereby reciprocally-rotating movements are imparted thereto, the pivoted shipper-lever 29, engaging said bar, a drive-chain 26, engaging said last-named lever, the vertical post 9, having a sprocket-wheel thereon engaging said chain, and the hand-lever 24, secured to said post, substantially as described.

8. In a road-vehicle the cams 33, 34, and 35, having one or more pins projecting from one side thereof, and a cam-groove 41, on the opposite side, combined with the shipper-bar 30, having the posts 39 and 40, for engagement with said pins, the clutch-shipping levers 42, 43, and 44 engaging in said cam-grooves, the clutch-disks, 45, 46, and 47, engaged by said shipping-levers, the gear-carrying clutch-cups 64, 65, and 66, for engagement with said disks, the shaft 4, having gears of varying diameters fixed thereon engaging with said gear-carrying clutch-cups, the shipper-operating lever 29, the tubular shaft 9, an operating-lever on said shaft, and connections between said shaft 9, for imparting vibratory motions to said shipper-operating lever, substantially as set forth.

HENRY W. CLAPP.

Witnesses:
H. A. CHAPIN,
K. I. CLEMONS.